(12) United States Patent
Manikantan

(10) Patent No.: US 12,206,655 B2
(45) Date of Patent: Jan. 21, 2025

(54) INTELLIGENT ACCESS REDIRECTION

(71) Applicant: ADP, Inc., Roseland, NJ (US)

(72) Inventor: Jyotsna Manikantan, Roseland, NJ (US)

(73) Assignee: ADP, Inc., Roseland, NJ (US)

( * ) Notice: Subject to any disclaimer, the term of this patent is extended or adjusted under 35 U.S.C. 154(b) by 248 days.

(21) Appl. No.: 17/804,989

(22) Filed: Jun. 1, 2022

(65) Prior Publication Data
US 2023/0396601 A1    Dec. 7, 2023

(51) Int. Cl.
*H04L 9/40* (2022.01)

(52) U.S. Cl.
CPC ............ *H04L 63/08* (2013.01); *H04L 63/102* (2013.01); *H04L 63/104* (2013.01)

(58) Field of Classification Search
CPC ......... H04L 63/08; H04L 9/32; H04L 63/102; H04L 63/104
USPC .......................................................... 726/5
See application file for complete search history.

(56) References Cited

U.S. PATENT DOCUMENTS

| | | | | |
|---|---|---|---|---|
| 2007/0038765 | A1* | 2/2007 | Dunn | G06F 21/6218 709/229 |
| 2008/0060951 | A1* | 3/2008 | Pantelis | A45C 11/00 206/6.1 |
| 2012/0272292 | A1* | 10/2012 | Chabbewal | H04L 63/08 709/224 |
| 2016/0103801 | A1* | 4/2016 | Bortz | G06F 16/9558 709/228 |
| 2020/0053096 | A1* | 2/2020 | Bendersky | G06F 21/32 |
| 2021/0336934 | A1* | 10/2021 | Deshmukh | H04L 63/105 |
| 2022/0116421 | A1* | 4/2022 | Yadav | H04L 63/1425 |
| 2022/0208319 | A1* | 6/2022 | Ansari | G16H 10/60 |

OTHER PUBLICATIONS

International Search Report and Written Opinion issued in corresponding International Application No. PCT/US2023/024054, dated Aug. 29, 2023 (12 pages).

* cited by examiner

*Primary Examiner* — Frantz B Jean
(74) *Attorney, Agent, or Firm* — Foley & Lardner LLP

(57) ABSTRACT

Intelligent access redirection is provided. An access request to access a secure website with user information and secure website details is relaunched utilizing an alternative access approach to access the secure website. Successful access to the secure website utilizing the alternative access approach is detected. The alternative access approach to access the secure website is saved in a user profile along with a reason to perform access redirection in response to detecting the successful access.

31 Claims, 5 Drawing Sheets

INTELLIGENT ACCESS REDIRECTION

BACKGROUND

1. Field

The disclosure relates generally to secure websites and more specifically to intelligent access redirection to a secure website for a subscribing user in response to receiving an incompatibility error message corresponding to an access request by the user to the secure website indicating a reason for the access redirection, such as, for example, incompatible user software or incompatible user hardware.

2. Description of the Related Art

A website is a collection of web pages. A web page is a digital file that is written using, for example, hypertext markup language. To make a website available to users, the website must be hosted on a web server connected to the Internet. A website can be thought of as a digital environment capable of delivering information and services to users to support the goals of an entity, such as, for example, a bank, corresponding to that website.

Website security includes measures taken by the entity to secure its website from unauthorized user access. For example, unauthorized user access to the entity's website can result in identity theft, monetary loss, ruined reputation, and the like to authorized users of the entity's website. As a result, the entity provides a secure website that requires user login credentials (e.g., username and password, biometric sample, or the like) to access the secure website or certain portions of the secure website containing, for example, personal, confidential, or sensitive information, such as bank account balance information, corresponding to authorized users of the secure website.

SUMMARY

According to one illustrative embodiment, a computer-implemented method for intelligent access redirection is provided. The computer relaunches an access request to access a secure website with user information and secure website details utilizing an alternative access approach to access the secure website. The computer detects successful access to the secure website utilizing the alternative access approach. The computer saves the alternative access approach to access the secure website in a user profile along with a reason to perform access redirection in response to detecting the successful access.

According to another illustrative embodiment, a computer system for intelligent access redirection is provided. The computer system comprises a bus system, a storage device storing program instructions connected to the bus system, and a processor executing the program instructions connected to the bus system. The computer system relaunches an access request to access a secure website with user information and secure website details utilizing an alternative access approach to access the secure website. The computer system detects successful access to the secure website utilizing the alternative access approach. The computer system saves the alternative access approach to access the secure website in a user profile along with a reason to perform access redirection in response to detecting the successful access.

According to another illustrative embodiment, a computer program product for intelligent access redirection is provided. The computer program product comprises a computer readable storage medium having program instructions embodied therewith, the program instructions executable by a computer to cause the computer to perform a method. The computer relaunches an access request to access a secure website with user information and secure website details utilizing an alternative access approach to access the secure website. The computer detects successful access to the secure website utilizing the alternative access approach. The computer saves the alternative access approach to access the secure website in a user profile along with a reason to perform access redirection in response to detecting the successful access.

According to another illustrative embodiment, a method for intelligent access redirection is provided. An access request to access a secure website is relaunched utilizing an alternative access approach to access the secure website. Successful access to the secure website utilizing the alternative access approach is detected. The alternative access approach is set as a default access approach for the secure website for future access requests.

DETAILED DESCRIPTION

Figure 1:
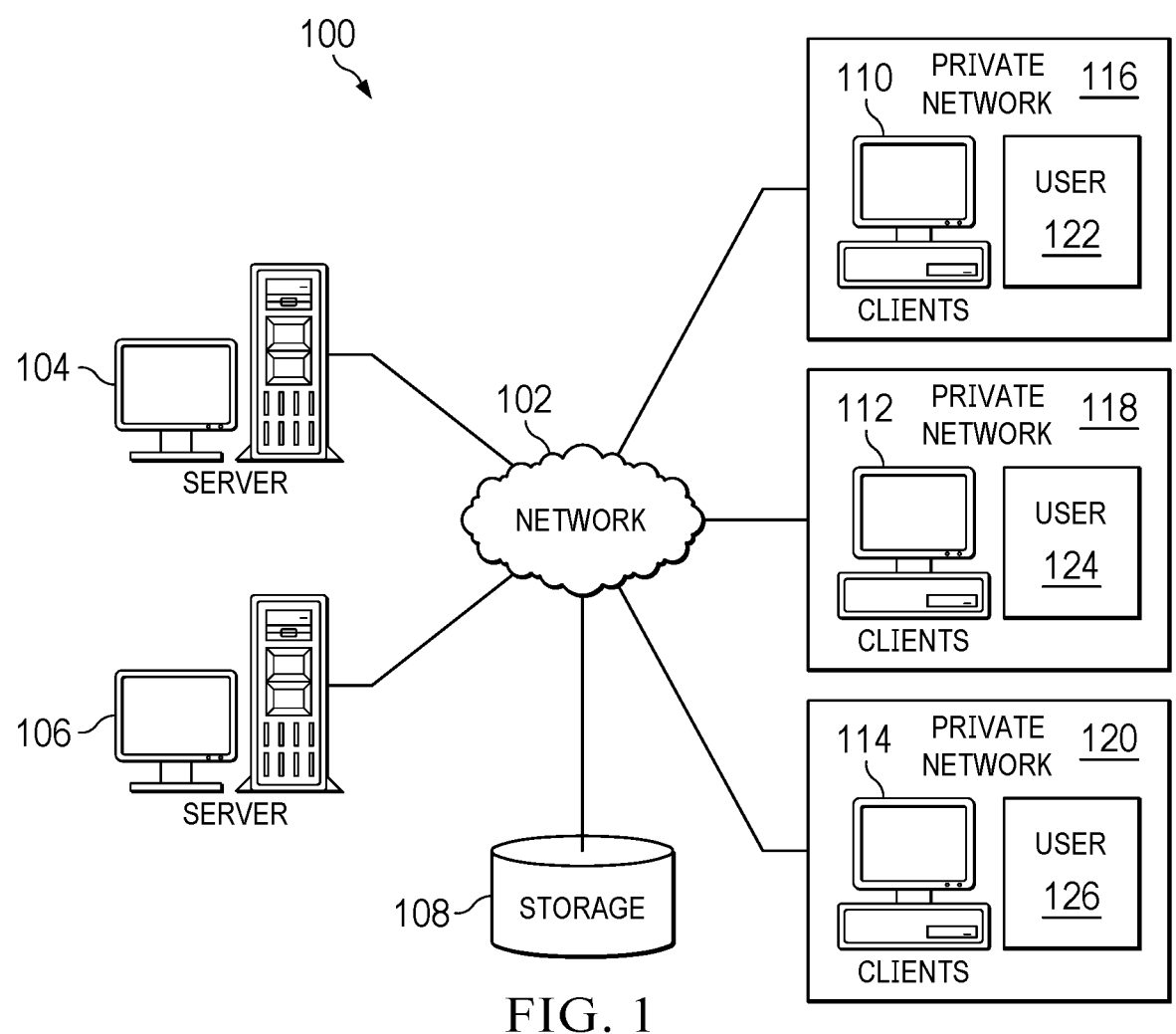
FIG. 1 is a pictorial representation of a network of data processing systems in which illustrative embodiments may be implemented.
Figure 2:
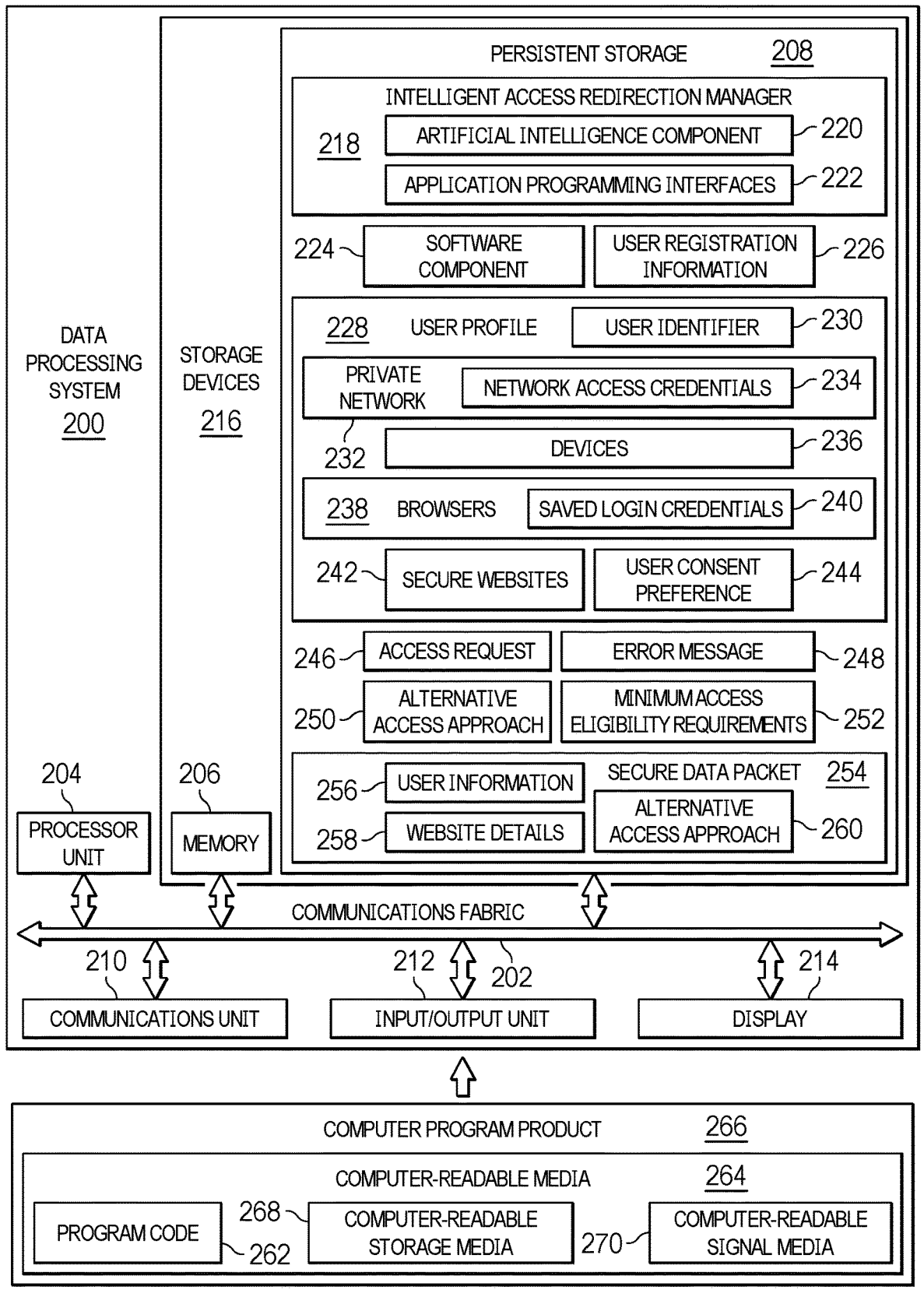
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent multiple computing nodes in one or more cloud environments.

In addition, server 104 is a web server that provides a service, such as, for example, a banking service, financial service, governmental service, educational service, healthcare service, data service, entertainment service, or the like, to authorized users of client devices via a secure website. The secure website hosted by server 104 requires valid user access credentials and minimum device access eligibility requirements to successfully access the secure website. Also, server 104 may be protected by a security system or a firewall server, which is not shown in this example.

Further, server 106 is an intelligent access redirection server that hosts an intelligent access redirection service, which is provided by an intelligent access redirection service provider, such as, for example, Automatic Data Processing, Inc. of Roseland, New Jersey, to subscribing client device users. Server 106 provides intelligent access redirection in response to detecting an incompatibility error message corresponding to an access request to a secure website by a subscribing client device user indicating a reason for the access redirection, such as, for example, incompatible browser, incompatible user client device, invalid user login credentials, or the like.

Based on identifying the reason for the access redirection in the incompatibility error message, server 106 identifies an alternative access approach using information contained in a user profile corresponding to the subscribing client device user. Server 106 collects the information contained in the user profile using, for example, a software component, such as a plug-in, applet, agent, or the like, downloaded from server 106 onto a client device associated with the subscribing user. The user profile can include information, such as, for example, client devices associated with the user, configurations of the client devices, browsers loaded on the client devices, secure websites corresponding to the user, secure website user login credentials, and the like. As a result, if the reason for the access redirection is, for example, an incompatible browser, then server 106 can search the information in the user profile and identify a compatible browser on the user's client device or on another client device associated with the user. Server 106 can then utilize the identified compatible browser as the alternative access approach to successfully access the secure website.

Clients 110, clients 112, and clients 114 also connect to network 102 via private network 116, private network 118, and private network 120, respectively. Clients 110, clients 112, and clients 114 are clients of server 104 and server 106. Each of clients 110, clients 112, and clients 114 represents a plurality of client devices associated with user 122, user 124, and user 126, respectively. Private network 116, private network 118, and private network 120 may each represent, for example, a secure Wireless Fidelity (Wi-Fi) home or office network corresponding user 122, user 124, and user 126, respectively.

In this example, clients 110, clients 112, and clients 114 are shown as desktop or personal computers with wireless communication links to private network 116, private network 118, and private network 120, respectively. However, it should be noted that clients 110, clients 112, and clients 114 are examples only and may represent other types of data processing systems, such as, for example, network computers, laptop computers, handheld or tablet computers, smart phones, smart watches, smart glasses, smart televisions, smart vehicles, smart appliances, virtual reality devices, gaming devices, and the like, with wire or wireless communication links to private network 116, private network 118, and private network 120. Users of clients 110, clients 112, and clients 114 may utilize clients 110, clients 112, and clients 114 to send access requests to the secure website hosted by server 104 to utilize the set of services offered on the secure website. Further, server 104 and server 106 may provide other information, such as, for example, applications, programs, files, data, and the like to clients 110, clients 112, and clients 114.

Storage 108 is a network storage device capable of storing any type of data in a structured format or an unstructured format. In addition, storage 108 may represent a plurality of network storage devices. Further, storage 108 may store identifiers for a plurality of private networks corresponding to client device users, identifiers and network addresses for a plurality of client devices, identifiers for a plurality of client device users, a plurality of user profiles corresponding to the client device users, minimum access eligibility requirements for a plurality of secure websites, and the like. Furthermore, storage 108 may store other types of data, such as authentication or credential data that can include usernames, passwords, biometric templates, and the like associated with, for example, client device users, system administrators, and security analysts.

In addition, it should be noted that network data processing system 100 may include any number of additional servers, clients, private networks, storage devices, and other devices not shown. Program code located in network data processing system 100 may be stored on a computer readable storage medium and downloaded to a computer or other data processing device for use. For example, program code may be stored on a computer readable storage medium on server 106 and downloaded to clients 110 over network 102 for use on clients 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 106 in FIG. 1, in which computer readable program code or instructions implementing the intelligent access redirection processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or computer readable storage medium is any piece of hardware that is capable of storing information, such as, for example, without limitation, data, computer readable program instructions in functional form, and/or other suitable information either on a transient basis or a persistent basis. Further, a computer readable storage device or computer readable storage medium excludes a propagation medium, such as a transitory signal. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores intelligent access redirection manager 218. However, it should be noted that even though intelligent access redirection manager 218 is illustrated as residing in persistent storage 208, in an alternative illustrative embodiment intelligent access redirection manager 218 may be a separate component of data processing system 200. For example, intelligent access redirection manager 218 may be a hardware component coupled to communication fabric 202 or a combination of hardware and software components.

Intelligent access redirection manager 218 controls the process of redirecting access to a secure website using an alternative access approach in response to an initial access request by a client device user to the secure website causing an incompatibility error message that indicates, for example, an incompatible browser, unsupported client device, invalid access credentials, or the like. Intelligent access redirection manager 218 includes artificial intelligence component 220. Intelligent access redirection manager 218 utilizes artificial intelligence component 220 to recognize and learn secure website access patterns of users, secure website minimum access eligibility requirements, alterative access approaches, reasons to perform access redirections, and the like.

Artificial intelligence component 220 can include statistical analysis, decision-making, reasoning, natural language processing, and the like. Natural language processing allows artificial intelligence component 220 to read and understand, for example, access requests, incompatibility error messages, and the like. Machine learning can be used to train artificial intelligence component 220. Machine learning improves automatically through experience. For example, supervised machine learning utilizes labeled training data to make predictions or decisions without being explicitly programmed to do so. Machine learning involves inputting the labeled training data into the process and allowing the process to adjust and improve the function of artificial intelligence component 220, thereby increasing the performance of data processing system 200, itself. The labeled training data may include, for example, historic user profile information. Artificial intelligence component 220 comprises at least one of an artificial neural network, cognitive system, Bayesian network, fuzzy logic, expert system, natural language system, or other suitable system.

Intelligent access redirection manager 218 also includes application programming interfaces 222. Intelligent access redirection manager 218 utilizes application programming interfaces 222 to perform different functions of the intelligent access redirection processes of illustrative embodiments. For example, intelligent access redirection manager 218 may utilize one application programming interface (API) to capture information corresponding to a subscribing client device user, such as, private network corresponding to the subscribing client device user, devices associated with the subscribing client device user that are connected to the private network, browsers loaded on the devices connected to the private network, secure websites accessed by the subscribing client device user, user access or login credentials utilized to access the secure websites, and the like. Intelligent access redirection manager 218 may utilize another API to generate or update a user profile corresponding to the subscribing client device user using the information captured by the first API. Intelligent access redirection manager 218 may utilize yet another API to determine whether the subscribing client device user has saved the user's consent in the user's profile enabling automatic access redirection using an alternative access approach when needed. If the user's consent is not saved, then this API prompts the user for consent to perform access redirection using the alternative access approach. Intelligent access redirection manager 218 may utilize yet another API to verify that the alternative access approach is viable (e.g., meets the minimum access eligibility requirements of the secure website). It should be noted alternative illustrative embodiments may incorporate artificial intelligence component 220 into one or more of application programming interfaces 222.

Software component 224 represents a software plugin, applet, agent, or the like, which corresponds to the intelligent access redirection service hosted by data processing system 200. Intelligent access redirection manager 218 downloads software component 224 onto a client device of the subscribing user in response to receiving user registration information 226. User registration information 226 may include basic information, such as, for example, user identifier, user mailing address, user email address, user phone number, and the like. User registration information 226 may also include optional information, such as, for example, private network corresponding to the user, devices associated with the user connected to the private network, browsers loaded on the devices connected to the private network, secure websites corresponding to the user, user access or login credentials, user consent preference, and the like. Intelligent access redirection manager 218 can also utilize software component 224, which is downloaded on the user's device, to collect and send the optional registration information to one or more of application programming interfaces 222.

Based on the information included in user registration information 226 and the information collected and sent by software component 224, intelligent access redirection manager 218 utilizes one of application programming interfaces 222 to generate user profile 228, which corresponds to the subscribing user associated with user registration information 226. It should be noted that user profile 228 may represent a plurality of different user profiles corresponding to a plurality of different subscribing users.

In this example, user profile 228 includes user identifier 230, private network 232, devices 236, browsers 238, secure websites 242, and user consent preference 244. However, it should be noted that user profile 228 is meant as an example only and not as a limitation on illustrative embodiments. In other words, user profile 228 may include other information not shown or may include less information than shown.

User identifier 230 uniquely identifies the subscribing user corresponding to user profile 228. The subscribing user may be, for example, user 122 in FIG. 1. Private network 232 uniquely identifies a secure network corresponding to the subscribing user. Private network 232 may be, for example, private network 116 in FIG. 1. However, it should be noted that private network 232 may represent a plurality of secure networks corresponding to the subscribing user. Network access credentials 234 represent login credential of the subscribing user to access private network 232. Devices 236 represent identifiers for a plurality of client devices associated with the subscribing user connected to private network 232. Devices 236 may be, for example, clients 110 in FIG. 1. Browsers 238 represent identifiers for a plurality of browsers loaded on each of devices 236. Saved login credential 240 represent any user login credentials that the subscribing user saved on browsers 238 to access one or more of secure websites 242. Secure websites 242 represent identifiers for a set of secure websites, such as, for example, a banking website, corresponding to the subscribing user. User consent preference 244 represents the subscribing user's preference regarding whether to store the user's consent to proactively use access redirection or not.

Access request 246 represents a current request by the subscribing user to access a desired secure website of secure websites 242. Error message 248 represents a failed access attempt to the desired secure website. Intelligent access redirection manager 218 utilizes artificial intelligence component 220 to read and analyze error message 248 to determine whether a reason to perform access redirection is contained in error message 248. For example, error message 248 may be an incompatible browser message.

Based on determining that a reason to perform access redirection is contained in error message 248, artificial intelligence component 220 searches user profile 228 to identify alternative access approach 250. In this example, artificial intelligence component 220 would identify a compatible web browser in browsers 238 as alternative access approach 250. Afterward, artificial intelligence component 220 verifies that alternative access approach 250 meets minimum access eligibility requirements 252. Minimum access eligibility requirements 252 represent the minimum requirements to successfully access the desired secure website. In this example, minimum access eligibility requirements 252 would be a specified web browser type and version.

In response to artificial intelligence component 220 verifying that alternative access approach 250 meets minimum access eligibility requirements 252, intelligent access redirection manager 218 generates secure data packet 254. Secure data packet 254 contains user information 256, website details 258, and alternative access approach 260. Artificial intelligence component 220 extracts user information 256 and website details 258 from access request 246. User information 256 may include, for example, username or user identifier, password, user client device configuration such as browser type and version, and the like. Website details 258 may include, for example, uniform resource locator of the desired secure website. It should be noted that alternative access approach 260 is the same as alternative access approach 250. Intelligent access redirection manager 218 may digitally sign secure data packet 254 with a private cryptographic key for increased security and increased recipient assurance that secure data packet is from a trusted source.

Intelligent access redirection manager 218 sends secure data packet 254 to a security system corresponding to the desired secure website to inform the security system that intelligent access redirection manager 218 is currently performing an authorized access redirection. In addition, intelligent access redirection manager 218 sends a digital signal to the device of the subscribing user to inform the device that alternative access approach 260 is being used to access the desired secure website to retain continuity.

Subsequently, intelligent access redirection manager 218 relaunches access request 246 utilizing alternative access approach 260 to access the secure website. In response to detecting successful access to the desired secure website utilizing alternative access approach 260, intelligent access redirection manager 218 saves alternative access approach 260 and the reason for performing the access redirection in user profile 228. Intelligent access redirection manager 218 may also set alternative access approach 260 as a default access approach for the subscribing user for that secure website.

As a result, data processing system 200 operates as a special purpose computer system in which intelligent access redirection manager 218 in data processing system 200 enables automatic secure website access redirection. In particular, intelligent access redirection manager 218 transforms data processing system 200 into a special purpose computer system as compared to currently available general computer systems that do not have intelligent access redirection manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, Wi-Fi, Bluetooth® technology, global system for mobile communications, code division multiple access, second-generation, third-generation, fourth-generation, fourth-generation long term evolution, long term evolution advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 262 is located in a functional form on computer readable media 264 that is selectively removable and may be loaded onto or transferred to data processing system 200 for running by processor unit 204. Program code 262 and computer readable media 264 form computer program product 266. In one example, computer readable media 264 may be computer readable storage media 268 or computer readable signal media 270.

In these illustrative examples, computer readable storage media 268 is a physical or tangible storage device used to store program code 262 rather than a medium that propagates or transmits program code 262. In other words, computer readable storage media 268 exclude a propagation medium, such as transitory signals. Computer readable storage media 268 may include, for example, an optical or magnetic disc that is inserted or placed into a drive or other device that is part of persistent storage 208 for transfer onto a storage device, such as a hard drive, that is part of persistent storage 208. Computer readable storage media 268 also may take the form of a persistent storage, such as a hard drive, a thumb drive, or a flash memory that is connected to data processing system 200.

Alternatively, program code 262 may be transferred to data processing system 200 using computer readable signal media 270. Computer readable signal media 270 may be, for example, a propagated data signal containing program code 262. For example, computer readable signal media 270 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 264" can be singular or plural. For example, program code 262 can be located in computer readable media 264 in the form of a single storage device or system. In another example, program code 262 can be located in computer readable media 264 that is distributed in multiple data processing systems. In other words, some instructions in program code 262 can be located in one data processing system while other instructions in program code 262 can be located in one or more other data processing systems. For example, a portion of program code 262 can be located in computer readable media 264 in a server computer while another portion of program code 262 can be located in computer readable media 264 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 262.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

In the ever-growing digital landscape, entities, such as, for example, enterprises, businesses, companies, organizations, institutions, agencies, and the like, search for ways to enhance user experience within and through their secure websites, which are accessible by users after the users have successfully logged-in to their secure websites. Currently, the volume of people who cannot access a particular secure website due to software or hardware incompatibility remains significant and overlooked. This loss of online traffic is directly related to loss of user productivity, loss of entity revenue, and the like, which have associated costs for these users and entities. Illustrative embodiments support users for uninterrupted access despite hardware and software incompatibilities.

Illustrative embodiments leverage digital signals in the secure website access process matching these digital signals against the minimum access eligibility requirements (e.g., security protocols) required by security systems corresponding to secure websites to access and utilize the services associated with these secure websites. Illustrative embodiments intercept a failed access attempt to generate a successful access based on an alternative access approach being available on a device corresponding to the user. Illustrative embodiments enable the user to have a successful, timely access to the requested service hosted by the secure website and prevent the user from experiencing a failed access attempt or receiving an incompatibility error message prompting the user to update the browser, which is an issue that can reoccur.

Today, a user can access a variety of services hosted by secure websites using different browsers loaded on the user's different devices or use an alternate browser on the current device. The user may have a preference for a particular browser (e.g., "Browser A") and use that particular browser to access a particular service hosted by a secure website. One possible reason for the user to utilize that particular browser may be that particular browser is capable of storing the user's login credentials (e.g., username/identifier and password pair) for accessing the secure website associated with that particular service.

However, that particular browser can go out-of-date when the user does not manually, or the user's device does not automatically, update the browser as needed for increased performance and security. If the browser is not updated, then the browser is rendered incompatible with the secure website and less secure. As a result, when the user utilizes the out-of-date browser to access the secure website associated with the desired service, such as, for example, a banking secure website, the security system corresponding to the secure website may return an error message to the user indicating that their browser is incompatible, and that the user cannot access the secure website until the browser on the user's device is updated.

However, the user may not know how to update the browser, or the user may not be authorized to update the browser on that device without assistance from a technical support team of an entity corresponding to the user. This delay may prevent the user from completing a time-sensitive task online, such as, for example, filing a legal document, submitting a financial report, applying for a corporate loan, providing documents for identity verification, or the like, within a defined deadline.

Due to the nature of browser updates and device settings imposed by network administrators of an entity, this delay can be costly for users. In addition, when a user is unable to complete a time-sensitive task for an entity, the entity may experience problems because inability to access a secure website to perform the task may require further follow up and processing delays, which can range from missed payroll processing to defaulted payments.

Issues associated with incompatible browsers are prevalent on user devices, such as, for example, desktop computers, mobile devices, and the like, which can result in service interruption. Typically, security systems corresponding to secure websites associate a particular user with a single device and a single channel of communication (e.g., a particular browser). Once the security system denies access, the user may have to follow certain procedures, such as, for example, call the system administrator or service representative, to regain access to the secure website, which can cause the user not to complete the time-sensitive task within the specified timeline.

Users generally utilize more than one device (e.g., desktop computer, laptop computer, smart phone, smart television, and the like) that is connected to a private network, utilize multiple communication methods (e.g., emails, text messaging, social media channels, and the like), have multiple browsers loaded on their devices, and utilize multiple authentication methods (e.g., username and passwords pairs, biometric samples, two factor authentication, and the like). The private network may be, for example, a secure personal network of the user (e.g., a protected home Wi-Fi network of the user) or a secure network corresponding to an entity associated with the user (e.g., a protected network of a company that employs the user). In this one user-multidimensional ecosystem, the intelligent access redirection service of illustrative embodiments utilizes an artificial intelligence component to connect to a data lake and leverages the information stored in the data lake to automatically redirect a secure website access process to an alternative access approach that supports the user in successfully completing access to a particular secure website in order for the user to perform a set of tasks, transactions, activities, and the like on that particular secure website.

The intelligent access redirection service of illustrative embodiments is located on a cloud environment. The intelligent access redirection service of illustrative embodiments provides the automatic access redirection process utilizing a plurality of integrated, real-time, synchronized application programming interfaces (APIs) that can read a secure website access request in transit and determine the default settings (i.e., the minimum access eligibility requirements) of the secure website to detect alternative access redirection details proactively enabling the user to successfully complete access to the secure website and utilize one or more services provided by the secure website.

When the user utilizes incompatible "Browser A", which is out-of-date and doesn't meet minimum security requirements, to access a secure website, an API of the intelligent access redirection service of illustrative embodiments detects the browser incompatibility, scans the user's device to identify the user's device and its configuration, and searches a user profile corresponding to that particular user in the data lake for an alternative compatible browser, which qualifies for successful access (i.e., meets the minimum access eligibility requirements of the secure website), on the user's device or on another device associated with the user. It should be noted that the data lake is encrypted storage for security. The API of the intelligent access redirection service searches the user profile for digital signals, such as, for example: browser version; browser security features; timestamps of access attempts (e.g., user login attempts) using this browser; most recent successful secure website access using this browser; stored username and password pairs on this browser with save dates; secure websites accessed using the stored username and password pairs; secure websites successfully accessed by the user by logging in with username, password, biometric sample, and the like; whether the user has enabled the intelligent access redirection service to utilize two factor authentication to verify a user access request; an alternative browser that has successfully accessed that particular secure website with recently saved username and password pair; an alternative application loaded on the user's device that the user can utilize to access that particular secure website with verification of recent access; and the like.

Upon detection of an alternative access approach (e.g., using alternative "Browser B" or an alternative application on the user's device), another API of the intelligent access redirection service of illustrative embodiments generates a secure network packet that contains login information of the user and details corresponding to the secure website (e.g., uniform resource locator and the like) and digitally signs the secure network packet using a cryptographic key for assurance that the user initiated the initial access attempt to the secure website using "Browser A" originally. Then, the API of the intelligent access redirection service loads alternative "Browser B" or the alternative application on the user's device with the digitally signed network packet, which contains the user's login information and secure website details, and reinitiates the access attempt to that particular secure website using alternative "Browser B" or the alternative application on the user's device.

Illustrative embodiments utilize the artificial intelligence component to record and learn access patterns and redirected access patterns that resulted in successful logins into secure websites. This information provides a pool of intelligence stored in the data lake (e.g., browser cookies, browser cache with user login credentials, access success or failure signals, and the like). Illustrative embodiments can apply this learned intelligence to subsequent users who are attempting to access a particular secure website using an incompatible browser to proactively inform and automatically reroute the access attempt to a known successful alternative browser or application on the user's device. The secure website receives the digital signals from the alternative browser to verify the access request is from a trusted browser of the user to grant access. Thus, the artificial intelligence component can recommend the appropriate browser or application to use to access a particular secure website based on historical data for increased user experience and security. As a result, illustrative embodiments enable users to have successful access to secure websites without receiving failed login messages or browser update messages, which can reoccur due to an out-of-date browser or browser that does not meet minimum access eligibility requirements.

The user downloads software, such as, for example, a browser plugin, applet, agent, or the like, which corresponds to the intelligent access redirection service of illustrative embodiments, on the user's device. The user downloads the software from a cloud server corresponding to the intelligent access redirection service. The downloaded software runs in the background on the user's device and connects to the intelligent access redirection service in response to the user attempting to access a secure website.

To download the software corresponding to the intelligent access redirection service of illustrative embodiments, the user may be required to register for the service. The initial registration may require to user to provide basic information, such as, for example, user identifier (e.g., first and last name), user address, user phone number, user payment method, and the like. The initial registration may optionally request other information, such as, for example, identifiers of a set of secure networks used by the user, devices utilized by the user and connected to the set of secure networks, browsers loaded on the devices utilized by the user and connected to the set of secure networks, secure websites accessed by the user, user consent preference, and the like. Upon completion of the initial registration, the intelligent access redirection service generates a user profile for the user and stores the user profile in the data lake for reference.

The intelligent access redirection service of illustrative embodiments utilizes a plurality of APIs, each API performing a different function corresponding to the service. For example, a first API utilizes the downloaded software (e.g., plugin, applet, agent, or the like corresponding to the intelligent access redirection service) on the user's device to identify and capture information corresponding to the user. For example, the first API can identify and capture login credentials of the user used to access secure websites (e.g., digital online accounts having restricted access); identify devices associated with the user (e.g., desktop computer, laptop computer, tablet computer, smart phone, smart watch, smart glasses, smart television, virtual reality device, and the like) connected to a secure network corresponding to the user; capture user's consent preference as to whether the user wants to store user consent to automatically utilize the intelligent access redirection service whenever the user desires to access a secure website as a default setting for proactive access redirection or whether the user wants to receive a user prompt to manually provide user consent each time the user desires to utilize the intelligent access redirection service while attempting to access a secure website; identify browsers loaded on the devices associated with the user along with any username and password pairs and access dates stored on the browsers; capture user login credentials for accessing the secure network corresponding to the user; and the like.

The intelligent access redirection service of illustrative embodiments utilizes a second API to build or augment the user profile corresponding to the user by utilizing the information identified and captured by the first API. The second API crawls the captured information of known domain names and subdomain names (e.g., secure websites accessed by the user) to build a verification mechanism in the user profile. As a result, the user profile is a repository of known devices, communication methods, recency of usage, and relevancy of usage corresponding to the verification mechanism. Further, the second API also tracks and records changes to user/device associations by capturing and verifying common access credentials of the user that associates the prior device with the current device. These common access credential can be associated with the same network, internet protocol address, geolocation, service provider, frequency of usage, and the like.

The intelligent access redirection service of illustrative embodiments utilizes a third API to determine whether user consent is stored in the user profile. If the third API determines that user consent is stored in the user profile, then the intelligent access redirection service automatically provides proactive access redirection as needed. If the third API determines that user consent is not stored in the user profile, then the intelligent access redirection service only provides access redirection on demand (i.e., when the user activates a prompt to utilize the intelligent access redirection service).

If user consent is not stored in the user profile, then the user initiates access to a secure website as usual. An API monitors the access request to the secure website to determine whether an error message for incompatible browser, unsupported device, or the like, is received from the secure website. If an error message is received, then an API interprets the error message to identify whether an alternative access approach (e.g., a different browser with greater security features) is available on the user's device or on another device associated with the user. If an alternative access approach is available, then an API verifies that the alternative access approach is viable (i.e., meets the minimum access eligibility requirements of the secure website). If the API verifies that the alternative access approach is viable, then the API sends a prompt (e.g., "Simplify Access Now" or "Not Now") to the user via a display with the viable alternative access approach that the intelligent access redirection service can utilize to successfully complete the access request to the secure website.

The intelligent access redirection service of illustrative embodiments utilizes a fourth API to verify that the alternative access approach available on the user's device or on another device associated with the user is viable (i.e., meets the minimum access eligibility requirements of the secure website). In response to the user manually activating the "Simplify Access Now" prompt, the fourth API captures the information associated with the access request and redirects to the alternative access approach. In addition, the fourth API generates and sends a digitally signed network packet that contains information regarding the change to the alternative access approach from the initial access approach to the security system corresponding to the secure website to assure the security system that an authorized access redirection is in progress not a hacking intercept. Further, the fourth API generates and sends a digital signal to the user's current device to alert the user's current device of the use of the alternative access approach to access the secure website to retain continuity and prevent loss of information. Moreover, the fourth API relaunches the access request utilizing the alternative access approach. The fourth API then monitors for successful access to the secure website. Upon successful access to the secure website, the fourth API records the alternative access approach and reasons for the access redirection in the user's profile and in the data lake for future reference. The intelligent access redirection service may set that particular alternative access approach as a preferred or default access approach for similar access requests to that particular secure website.

In response to the third API determining that user consent is saved in the user profile (i.e., proactive access redirection is always enabled), the fourth API performs verification of the relaunch of the access request. For example, the artificial intelligence component of the fourth API checks for an alternative access approach (e.g., alternative browser, device, authentication method, or the like) to successfully complete the access request in response to receiving an error message (e.g., incompatible browser, device, authentication method, or the like) from the secure website. The fourth API automatically captures the information associated with the original access request (e.g., browser, device, authentication method initially used) and automatically redirects to the alternative access approach. The fourth API generates and sends a digitally signed network packet that contains the information regarding the change to the alternative access approach from the initial access approach to the security system corresponding to the secure website to assure the security system that an authorized access redirection is in progress not a hacking intercept. Further, the fourth API generates and sends a digital signal to the user's current device to alert the user's current device of the use of the alternative access approach to access the secure website to retain continuity and prevent loss of information. Moreover, the fourth API relaunches the current access request utilizing the alternative access approach. The fourth API then monitors for successful access to the secure website. Upon successful access to the secure website, the fourth API records the alternative access approach and reasons for the access redirection in the user's profile and in the data lake for future reference. The intelligent access redirection service may set that particular alternative access approach as a preferred or default access approach for similar access requests to that particular secure website.

In an alternative illustrative embodiment, in addition to, or instead of, a user downloading the software component corresponding to the intelligent access redirection service onto the user's device to utilize the intelligent access redirection service, subscribing secure websites can offer the intelligent access redirection service as an option to users of these subscribing secure websites. For example, a user types a uniform resource locator of a particular subscribing secure website in a browser loaded on a device of the user and hits enter. Upon initial page load of that particular subscribing secure website, a web component located on that initial page or a popup can provide the user with an option to utilize the intelligent access redirection service of illustrative embodiments to ensure a secure and seamless access experience for the user.

Thus, illustrative embodiments provide one or more technical solutions that overcome a technical problem with an inability to access and perform a time-sensitive task on a secure website due to at least one of a software or hardware incompatibility. As a result, these one or more technical solutions provide a technical effect and practical application in the field of computer networks and secure website accessibility.

Figure 3:
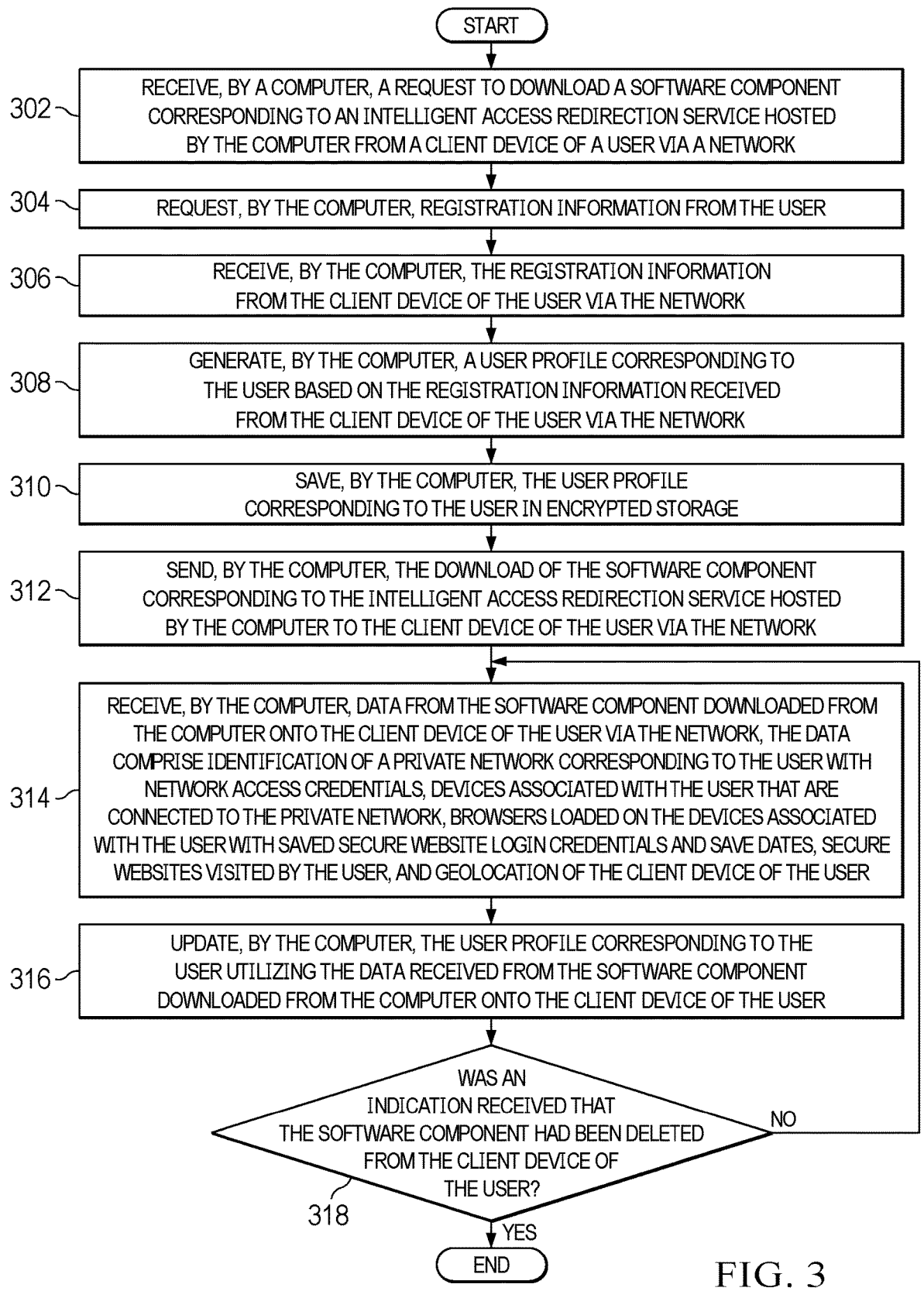
FIG. 3 is a flowchart illustrating a process for collecting user client device data in accordance with an illustrative embodiment.

With reference now to FIG. 3, a flowchart illustrating a process for collecting user client device data is shown in accordance with an illustrative embodiment. The process shown in FIG. 3 may be implemented in a computer, such as, for example, server 106 in FIG. 1 or data processing system 200 in FIG. 2. For example, the process can be implemented in intelligent access redirection manager 218 in FIG. 2.

The process begins when the computer receives a request to download a software component corresponding to an intelligent access redirection service hosted by the computer from a client device of a user via a network (step 302). The computer requests registration information from the user (step 304). The computer receives the registration information from the client device of the user via the network (step 306).

The computer generates a user profile corresponding to the user based on the registration information received from the client device of the user via the network (step 308). The computer saves the user profile corresponding to the user in encrypted storage (step 310). In addition, the computer sends the download of the software component corresponding to the intelligent access redirection service hosted by the computer to the client device of the user via the network (step 312).

Afterward, the computer receives data from the software component downloaded on the client device of the user via the network (step 314). The data comprise identification of a private network corresponding to the user with network access credentials, devices associated with the user that are connected to the private network, browsers loaded on the devices associated with the user with saved secure website login credentials and save dates, secure websites visited by the user, and geolocation of the client device of the user. The computer can receive the data from the software component on a continuous basis, on a defined time interval basis, or on demand.

The computer updates the user profile corresponding to the user utilizing the data received from the software component downloaded from the computer onto the client device of the user (step 316). The computer also makes a determination as to whether an indication was received that the software component had been deleted from the client device of the user (step 318). If the computer determines that no indication was received that the software component had been deleted from the client device of the user, no output of step 318, then the process returns to step 314 where the computer continues to receive the data from the software component continuously, intermittently, or on demand. If the computer determines that an indication was received that the software component had been deleted from the client device of the user, yes output of step 318, then the process terminates thereafter.

Figure 4A:
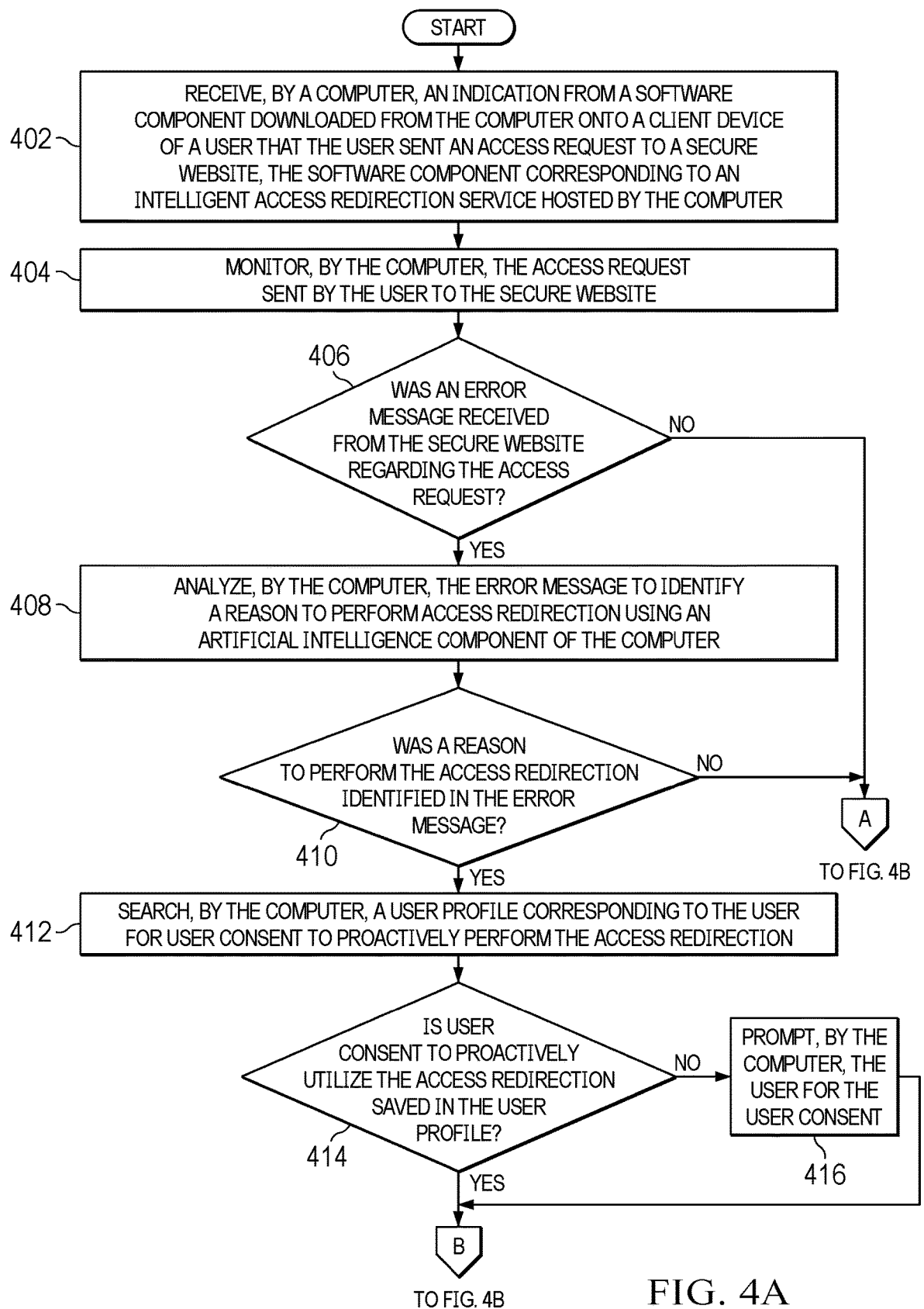
FIGS. 4A-4B are a flowchart illustrating a process for intelligent access redirection in accordance with an illustrative embodiment.
Figure 4B:
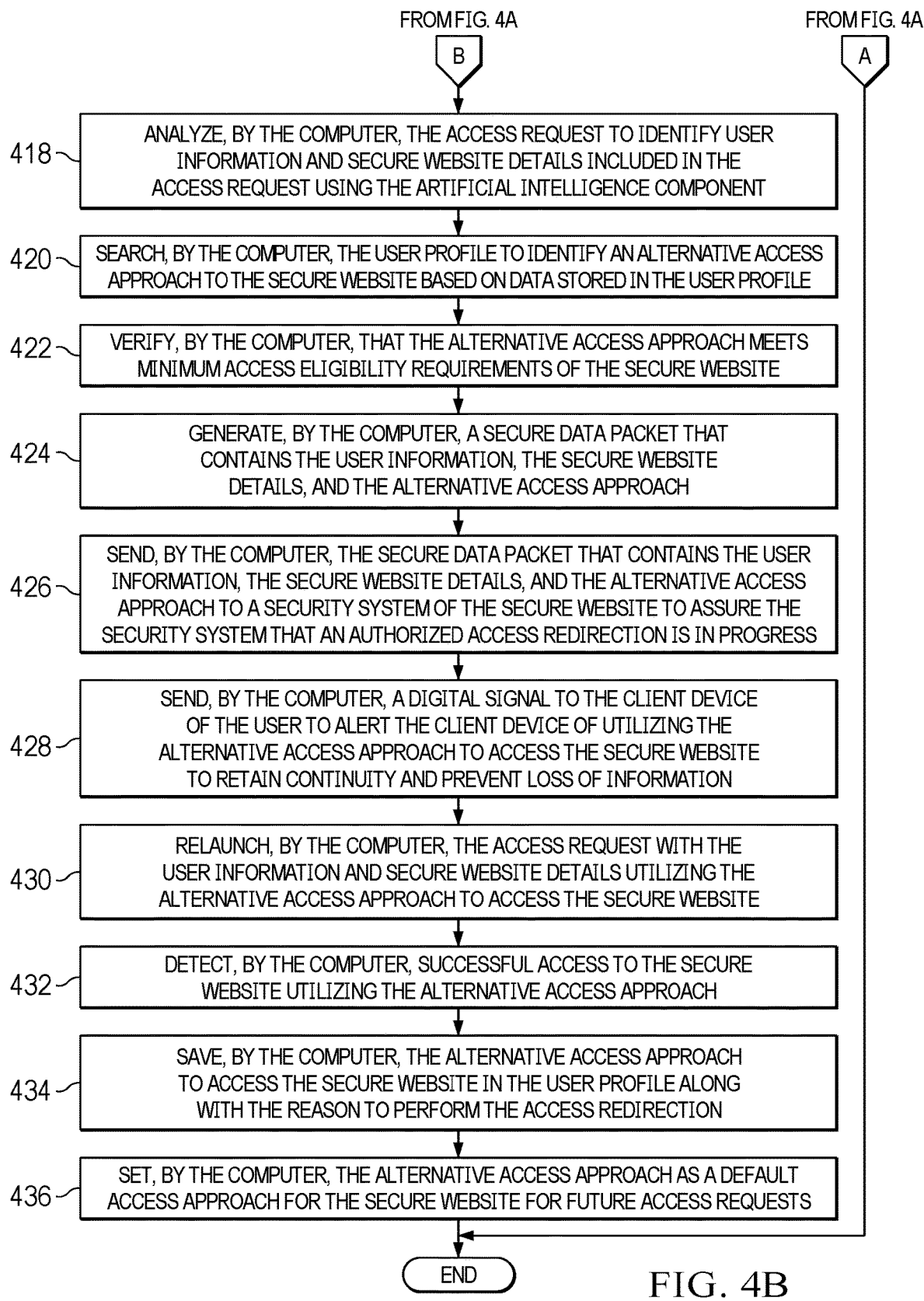

With reference now to FIGS. 4A-4B, a flowchart illustrating a process for intelligent access redirection is shown in accordance with an illustrative embodiment. The process shown in FIGS. 4A-4B may be implemented in a computer, such as, for example, server 106 in FIG. 1 or data processing system 200 in FIG. 2. For example, the process can be implemented in intelligent access redirection manager 218 in FIG. 2.

The process begins when the computer receives an indication from a software component downloaded from the computer onto a client device of a user that the user sent an access request to a secure website (step 402). The software component corresponds to an intelligent access redirection service hosted by the computer. The computer monitors the access request sent by the user to the secure website (step 404).

The computer makes a determination as to whether an error message was received from the secure website regarding the access request based on the monitoring (step 406). If the computer determines that no error message was received from the secure website regarding the access request and access to the secure website was successful based on the monitoring, no output of step 406, then the process terminates thereafter. If the computer determines that an error message was received from the secure website regarding the access request based on the monitoring, yes output of step 406, then the computer analyzes the error message to identify a reason to perform access redirection using an artificial intelligence component of the computer (step 408). A reason to perform the access redirection may include, for example, incompatible browser, unsupported user client device, invalid authentication, or the like.

The computer makes a determination as to whether a reason to perform the access redirection was identified in the error message (step 410). If the computer determines that no reason to perform the access redirection was identified in the error message, no output of step 410, then the process terminates thereafter. If the computer determines that a reason to perform the access redirection was identified in the error message, yes output of step 410, then the computer searches a user profile corresponding to the user for user consent to proactively perform the access redirection (step 412).

The computer makes a determination as to whether user consent to proactively perform the access redirection is saved in the user profile based on the search (step 414). If the computer determines that user consent to proactively perform the access redirection is not saved in the user profile based on the search, no output of step 414, then the computer prompts the user for the user consent (step 416). Thereafter, the process proceeds to step 418. If the computer determines that user consent to proactively perform the access redirection is saved in the user profile based on the search, yes output of step 414, then the computer analyzes the access request to identify user information and secure website details included in the access request using the artificial intelligence component (step 418). The user information may include, for example, username or user identifier, password, user client device configuration such as browser type and version, and the like. The secure website details may include, for example, uniform resource locator, Internet protocol address, domain name, and the like.

In addition, the computer searches the user profile to identify an alternative access approach to the secure website based on data stored in the user profile (step 420). The alternative access approach may include, for example, an alternative browser, an alternative user client device, an alternative username and password pair, an alternative authentication method, or any combination thereof. In response to identifying the alternative access approach, the computer verifies that the alternative access approach meets minimum access eligibility requirements of the secure website (step 422).

In response to verifying that the alternative access approach meets minimum access eligibility requirements of the secure website, the computer generates a secure data packet that contains the user information, the secure website details, and the alternative access approach (step 424). The computer may also digitally sign the secure data packet. The computer sends the secure data packet that contains the user information, the secure website details, and the alternative access approach to a security system of the secure website to assure the security system that an authorized access redirection is in progress (step 426). Furthermore, the computer sends a digital signal to the client device of the user to alert the client device of utilizing the alternative access approach to access the secure website to retain continuity and prevent loss of information (step 428).

Afterward, the computer relaunches the access request with the user information and secure website details utilizing the alternative access approach to access the secure website (step 430). The computer detects successful access to the secure website utilizing the alternative access approach (step 432). The computer saves the alternative access approach to access the secure website in the user profile along with the reason to perform the access redirection in response to detecting the successful access (step 434). The computer also sets the alternative access approach as a default access approach for the secure website for future access requests (step 436). Thereafter, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, illustrative embodiments of the present invention provide a computer-implemented method, computer system, and computer program product for providing intelligent access redirection to a secure website for a user in response to receiving an incompatibility error message corresponding to the access request. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for intelligent access redirection, the computer-implemented method comprising:
   identifying, by a computer, a first access request configured to access a secure website in accordance with a first access approach;
   detecting, by the computer, an incompatibility between the first access request or the first access approach and an interface of the secure website based on a message received from the secure website, the message including information to identify a reason for the incompatibility;
   identifying, by the computer, an alternative access approach to access the secure website based on the reason for the incompatibility, the alternative access approach different from the first access approach used by the first access request;
   launching, by the computer, a second access request to access the secure website with user information and secure website details utilizing the alternative access approach to access the secure website;
   detecting, by the computer, successful access to the secure website utilizing the alternative access approach; and
   saving, by the computer, responsive to detecting the successful access to the secure website, the alternative access approach to access the secure website in a user profile along with a second reason, based on the incompatibility, to perform access redirection utilizing the alternative access approach.

2. The computer-implemented method of claim 1 further comprising:
   setting, by the computer, the alternative access approach as a default access approach for the secure website for future access requests.

3. The computer-implemented method of claim 1 further comprising:
   generating, by the computer, a secure data packet that contains the user information, the secure website details, and the alternative access approach in response to verifying that the alternative access approach meets minimum access eligibility requirements of the secure website;
   sending, by the computer, the secure data packet that contains the user information, the secure website details, and the alternative access approach to a security system of the secure website to assure the security system that an authorized access redirection is in progress; and
   sending, by the computer, a digital signal to a client device that sent the first access request to alert the client device of utilizing the alternative access approach to access the secure website to retain continuity and prevent loss of information.

4. The computer-implemented method of claim 1 further comprising:
   receiving, by the computer, an indication from a software component downloaded from the computer onto a client device that sent the first access request to the secure website, the software component corresponding to an intelligent access redirection service hosted by the computer; and
   monitoring, by the computer, the first access request sent to the secure website.

5. The computer-implemented method of claim 1 further comprising:

analyzing, by the computer, the message to identify the reason for the incompatibility using an artificial intelligence component of the computer in response to the computer determining that the message was received from the secure website regarding the first access request.

6. The computer-implemented method of claim 1 further comprising:
   determining, by the computer, whether a reason to perform access redirection was identified in the message; and
   searching, by the computer, the user profile corresponding to a computing device that sent the first access request for consent to proactively perform the access redirection.

7. The computer-implemented method of claim 1 further comprising:
   determining, by the computer, whether consent to proactively perform the access redirection is saved in the user profile; and
   analyzing, by the computer, the first access request to identify the user information and the secure website details included in the access request using an artificial intelligence component.

8. The computer-implemented method of claim 1 further comprising:
   searching, by the computer, the user profile to identify the alternative access approach to the secure website based on data stored in the user profile; and
   verifying, by the computer, that the alternative access approach meets minimum access eligibility requirements of the secure website in response to identifying the alternative access approach to the secure website based on the data stored in the user profile.

9. The computer-implemented method of claim 1 further comprising:
   receiving, by the computer, via a network, data from a software component downloaded onto a client device that sent the first access request, the data comprising identification of a private network corresponding to network access credentials, devices that are connected to the private network, browsers loaded on the devices with saved secure website login credentials and save dates, secure websites, and geolocation of the client device.

10. The computer-implemented method of claim 9 further comprising:
    updating, by the computer, the user profile corresponding to utilization of the data received from the software component downloaded from the computer onto the client device.

11. A computer system for intelligent access redirection, the computer system comprising:
    a bus system;
    a storage device connected to the bus system, wherein the storage device stores program instructions; and
    a processor connected to the bus system, wherein the processor executes the program instructions to:
       identify a first access request used to access a secure website in accordance with a first access approach;
       detect an incompatibility between a first access request or the first access approach and an interface of the secure website based on a message received from the secure website, the message including information to identify a reason for the incompatibility;
       identify an alternative access approach to access the secure website based on the reason for the incompatibility, the alternative access approach different from the first access approach used by the first access request;

launch a second access request to access the secure website with user information and secure website details utilizing the alternative access approach to access the secure website;

detect successful access to the secure website utilizing the alternative access approach; and save, responsive to detection of the successful access to the secure website, the alternative access approach to access the secure website in a user profile along with a second reason, based on the incompatibility, to perform access redirection utilizing the alternative access approach.

12. The computer system of claim 11, wherein the processor further executes the program instructions to:

set the alternative access approach as a default access approach for the secure website for future access requests.

13. The computer system of claim 11, wherein the processor further executes the program instructions to:

generate a secure data packet that contains the user information, the secure website details, and the alternative access approach in response to verifying that the alternative access approach meets minimum access eligibility requirements of the secure website;

send the secure data packet that contains the user information, the secure website details, and the alternative access approach to a security system of the secure website to assure the security system that an authorized access redirection is in progress; and send a digital signal to a client device that sent the first access request to alert the client device of utilizing the alternative access approach to access the secure website to retain continuity and prevent loss of information.

14. The computer system of claim 11, wherein the processor further executes the program instructions to:

receive an indication from a software component downloaded onto a client device that sent the first access request to the secure website, the software component corresponding to an intelligent access redirection service; and monitor the first access request sent to the secure website.

15. The computer system of claim 11, wherein the processor further executes the program instructions to:

analyze the message to identify the reason for the incompatibility using an artificial intelligence component in response determining that the message was received from the secure website regarding the first access request.

16. The computer system of claim 11, wherein the processor further executes the program instructions to:

determine whether a reason to perform access redirection was identified in the message; and search the user profile corresponding to a computing device that sent the first access request for consent to proactively perform the access redirection.

17. The computer system of claim 11, wherein the processor further executes the program instructions to:

determine whether consent to proactively perform the access redirection is saved in the user profile; and analyze the first access request to identify the user information and the secure website details included in the access request using an artificial intelligence component.

18. The computer system of claim 11, wherein the processor further executes the program instructions to:

search the user profile to identify the alternative access approach to the secure website based on data stored in the user profile; and verify that the alternative access approach meets minimum access eligibility requirements of the secure website in response to identifying the alternative access approach to the secure website based on the data stored in the user profile.

19. The computer system of claim 11, wherein the processor further executes the program instructions to:

receive, via a network, data from a software component downloaded onto a client device that sent the first access request, the data comprising identification of a private network corresponding to network access credentials, devices associated that are connected to the private network, browsers loaded on the devices with saved secure website login credentials and save dates, secure websites, and geolocation of the client device.

20. The computer system of claim 19, wherein the processor further executes the program instructions to:

update the user profile corresponding to utilization of the data received from the software component downloaded onto the client device of the user.

21. A computer program product for intelligent access redirection, the computer program product comprising a computer readable storage medium having program instructions embodied therewith, the program instructions executable by a computer to cause the computer to perform a method of:

identifying, by the computer, a first access request used to access a secure website in accordance with a first access approach;

detecting, by the computer, an incompatibility between the first access request or the first access approach and an interface of the secure website based on a message received from the secure website, the message including information to identify a reason for the incompatibility;

identifying, by the computer, an alternative access approach to access the secure website based on the reason for the incompatibility, the alternative access approach different from the first access approach used by the first access request;

launching, by the computer, a second access request to access the secure website with user information and secure website details utilizing the alternative access approach to access the secure website;

detecting, by the computer, successful access to the secure website utilizing the alternative access approach; and saving, by the computer, responsive to detecting the successful access to the secure website, the alternative access approach to access the secure website in a user profile along with a second reason, based on the incompatibility, to perform access redirection utilizing the alternative access approach.

22. The computer program product of claim 21 further comprising:

setting, by the computer, the alternative access approach as a default access approach for the secure website for future access requests.

23. The computer program product of claim 21 further comprising:

generating, by the computer, a secure data packet that contains the user information, the secure website details, and the alternative access approach in response to verifying that the alternative access approach meets minimum access eligibility requirements of the secure website;

sending, by the computer, the secure data packet that contains the user information, the secure website details, and the alternative access approach to a security system of the secure website to assure the security system that an authorized access redirection is in progress; and sending, by the computer, a digital signal to a client device that sent the first access request to alert the client device of utilizing the alternative access approach to access the secure website to retain continuity and prevent loss of information.

24. The computer program product of claim 21 further comprising:

receiving, by the computer, an indication from a software component downloaded from the computer onto a client device that sent the first access request to the secure website, the software component corresponding to an intelligent access redirection service hosted by the computer; and monitoring, by the computer, the first access request sent to the secure website.

25. The computer program product of claim 21 further comprising:

analyzing, by the computer, the message to identify the reason to perform for the incompatibility using an artificial intelligence component of the computer in response to the computer determining that the message was received from the secure website regarding the access request.

26. The computer program product of claim 21 further comprising:

determining, by the computer, whether a reason to perform access redirection was identified in the; and searching, by the computer, the user profile corresponding to a computing device that sent the first access request for consent to proactively perform the access redirection.

27. The computer program product of claim 21 further comprising:

determining, by the computer, whether consent to proactively perform the access redirection is saved in the user profile; and analyzing, by the computer, the first access request to identify the user information and the secure website details included in the access request using an artificial intelligence component.

28. The computer program product of claim 21 further comprising:

searching, by the computer, the user profile to identify the alternative access approach to the secure website based on data stored in the user profile; and verifying, by the computer, that the alternative access approach meets minimum access eligibility requirements of the secure website in response to identifying the alternative access approach to the secure website based on the data stored in the user profile.

29. The computer program product of claim 21 further comprising:

receiving, by the computer, via a network, data from a software component downloaded onto a client device that sent the first access request, the data comprising identification of a private network corresponding network access credentials, devices connected to the private network, browsers loaded on the devices with saved secure website login credentials and save dates, secure websites, and geolocation of the client device.

30. The computer program product of claim 29 further comprising:

updating, by the computer, the user profile corresponding to utilization of the data received from the software component downloaded from the computer onto the client device of the user.

31. A method for intelligent access redirection, the method comprising:

identifying, by a computer, a first access request used to access a secure website in accordance with a first access approach;

detecting, by the computer, an incompatibility between the first access request or the first access approach and an interface of the secure website;

identifying, by the computer, an alternative access approach to access the secure website based on criteria associated with the secure website, the alternative access approach different from the first access approach used by the first access request;

launching, by the computer, a second access request to access the secure website utilizing an alternative access approach to access the secure website;

detecting, by the computer, successful access to the secure website utilizing the alternative access approach; and setting, by the computer, responsive to detection the successful access to the secure website, the alternative access approach as a default access approach for the secure website for future access requests.

* * * * *